United States Patent
Kim et al.

(10) Patent No.: US 8,147,134 B2
(45) Date of Patent: Apr. 3, 2012

(54) METHOD AND APPARATUS FOR ISOTOPE IDENTIFICATION AND RADIOACTIVITY MEASUREMENT OF ALPHA-EMITTING-RADIONUCLIDES USING A LOW TEMPERATURE DETECTOR

(75) Inventors: Yong Hamb Kim, Daejeon (KR); Kyoung Beom Lee, Daejeon (KR); Min Kyu Lee, Daejeon (KR); Sang Jun Lee, Seoul (KR)

(73) Assignee: Korea Research Institute of Standards and Science, Daejeon (KR)

( * ) Notice: Subject to any disclaimer, the term of this patent is extended or adjusted under 35 U.S.C. 154(b) by 842 days.

(21) Appl. No.: 12/166,496

(22) Filed: Jul. 2, 2008

(65) Prior Publication Data

US 2009/0185596 A1    Jul. 23, 2009

(30) Foreign Application Priority Data

Jan. 22, 2008    (KR) ........................ 10-2008-0006429

(51) Int. Cl.
*G01N 25/00* (2006.01)
*G01K 17/00* (2006.01)
*G01K 11/00* (2006.01)
*G01K 7/00* (2006.01)
*G09K 11/04* (2006.01)

(52) U.S. Cl. ......... 374/45; 374/163; 374/31; 250/336.2; 250/339.07; 252/625; 422/159

(58) Field of Classification Search ............... 250/357.1, 250/370.07, 302, 303, 390.06, 390.01, 264, 250/362, 369; 600/431; 436/57.5; 252/625; 374/100, 120, 43, 45, 31, 159, 161
See application file for complete search history.

(56) References Cited

U.S. PATENT DOCUMENTS

| | | | |
|---|---|---|---|
| 6,492,642 B1 * | 12/2002 | Belanov et al. | 250/364 |
| 2005/0133726 A1 * | 6/2005 | Frankle et al. | 250/390.06 |
| 2010/0268074 A1 * | 10/2010 | Van Loef et al. | 600/431 |
| 2010/0276599 A1 * | 11/2010 | Mann et al. | 250/362 |
| 2010/0294415 A1 * | 11/2010 | Frank | 156/64 |
| 2010/0294939 A1 * | 11/2010 | Kuntz et al. | 250/361 R |
| 2011/0015886 A1 * | 1/2011 | Frank | 702/75 |
| 2011/0036988 A1 * | 2/2011 | Campbell et al. | 250/370.07 |

* cited by examiner

*Primary Examiner* — Gail Verbitsky
(74) *Attorney, Agent, or Firm* — Thomas R. FitzGerald, Esq.; Hiscock & Barclay, LLP

(57) ABSTRACT

Disclosed herein are a method and an apparatus to identify alpha-emitting radionuclides and to measure absolute alpha radioactivity using a low temperature detector. A $4\pi$ metallic absorber which encloses a radioactive material containing alpha-emitting radionuclides absorbs the total alpha decay energy in the form of thermal energy. The corresponding temperature changes are measured by a low temperature detector attached to the $4\pi$ absorber with high energy resolution. The identification of alpha-emitting radionuclides is declared by comparing the measured temperature signal with characteristic decay energy of radionuclides. The absolute amount of the radionuclides is determined by counting the number of the pulses for each of the identified nuclides.

10 Claims, 2 Drawing Sheets

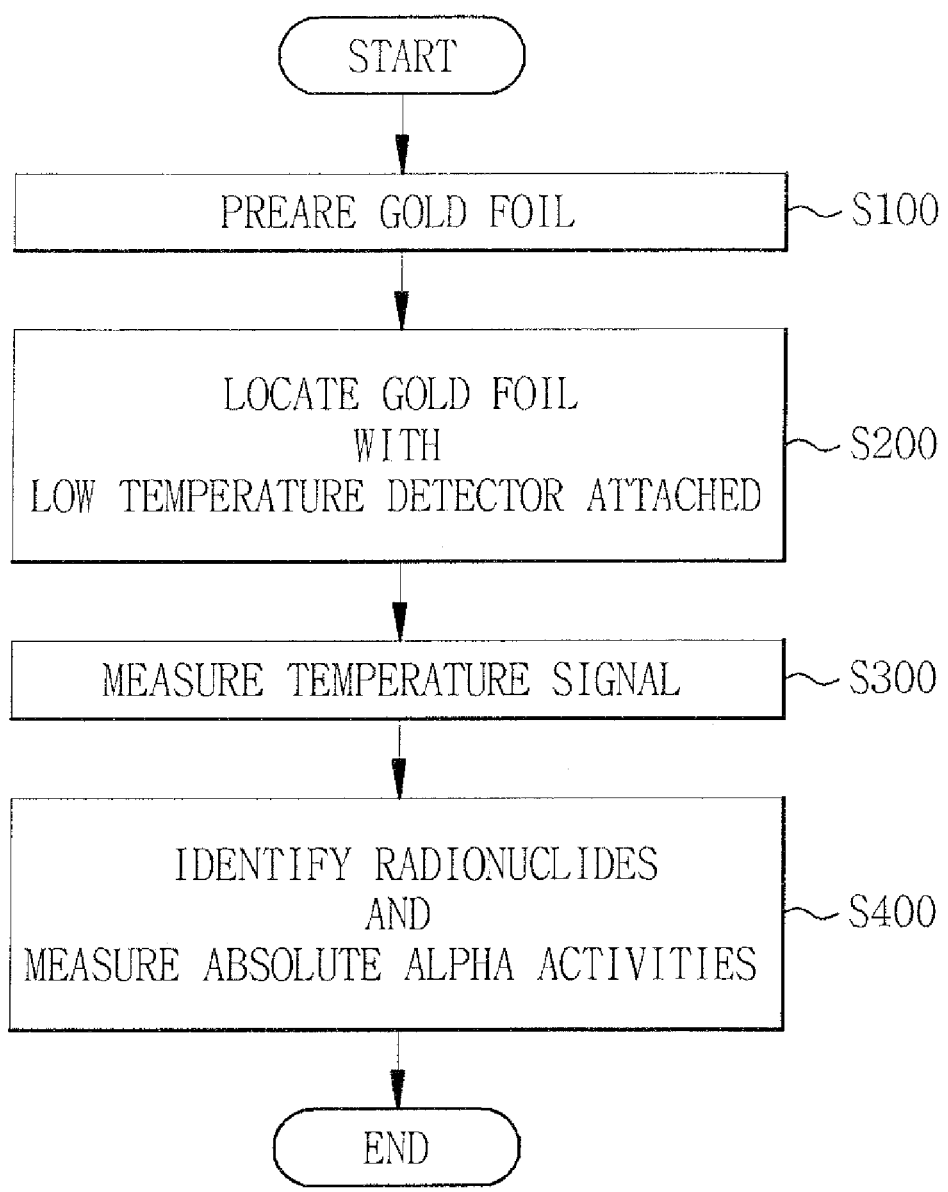

METHOD AND APPARATUS FOR ISOTOPE IDENTIFICATION AND RADIOACTIVITY MEASUREMENT OF ALPHA-EMITTING-RADIONUCLIDES USING A LOW TEMPERATURE DETECTOR

CROSS REFERENCE TO RELATED APPLICATIONS

This application claims priority to Korean Patent Application Number 10-2008-0006429 filed Jan. 22, 2008.

BACKGROUND OF THE INVENTION

1. Field of the Invention

The present invention is related to the field of radioactivity measurement. The invention provides a method for both isotope identification and radioactivity measurement of alpha-emitting radionuclides. It is based on the calorimetric particle detection in a metallic 4π geometry using a low temperature detector.

2. Background of the Related Art

Generally, alpha spectrometry or mass spectrometry is used as a method of identifying radionuclides. Such conventional methods require many necessary chemical pretreatments which include acid digestion for solid specimens, and separation and purification of atomic species of interest. A few known concentrations of specific nuclides may be added as a tracer for an isotope dilution analysis during the pretreatment.

However, the conventional alpha spectrometry and the mass spectrometry of measuring radionuclides have the following limitations.

First, the solid-state detectors used in the conventional alpha spectrometry have a limit in their energy resolution. The identification of many radionuclides whose characteristic alpha lines are close to each other is intrinsically limited by the detector resolution. For instance, it causes difficulties in identifying $^{239}$Pu signals from $^{240}$Pu ones.

Second, the inductive coupling plasma mass spectrometry (ICP-MS), the most frequently used mass spectrometry for the purpose, often suffers from interfering overlaps of polyatomic ions of chemical matrix while it provides high mass resolution. The identification technique using ICP-MS detection requires complicated and time-consuming but necessary procedures of separations and purifications for each set of measuring isotopes. In addition, it needs adding a set of known radionuclides to the analytes in order to estimate relative concentrations of measuring radionuclides.

SUMMARY OF THE INVENTION

The present invention has been designed in view of the previously mentioned considerations occurring in the prior art. It is a primary object of the present invention to provide a method and an apparatus for identifying alpha-emitting radionuclides and measuring absolute amount of each of them by using a calorimetric detection technique putting radioactive source in a 4π geometry to practical use.

In this method, the sample source containing alpha-emitting radionuclides is sealed up with a gold foil to prevent alpha disintegration energy from radiating to the outside of the foil. The energy absorbed in the gold foil is entirely converted to the thermal energy, which results in the temperature change of the gold foil. The temperature change is accurately measured with a low temperature detector having high resolution, to thereby achieve a precise measurement of alpha decay energy from a specific radionuclide.

This invention is contrived as a method of completely enclosing a small volume of material containing radionuclides with a gold foil forming a metallic 4π geometry to serve as an absorber. It leads to convert the energy emitted from radionuclides into thermal energy. It is possible to identify the radioactive isotopes by comparing the characteristic decay energy with the magnitudes of the temperature signals. The number of signals from each magnitude estimates the absolute amount of each isotope in the 4π geometry.

To accomplish the above object of the present invention there is provided a method of measuring absolute alpha radioactivity and identifying alpha-emitting radionuclides using a low temperature detector, the method comprising: first step, S100 to make a 4.pi. metallic geometry with a metal foil 10, preferably a gold foil 10 which encloses an alpha-emitting sample 11; second step, S200 to make a thermal connection between the gold foil 10 and the low temperature detector and to locate the low temperature detector on the measuring means 40; third step, S300 to obtain temperature signals according to a temperature rise resulting from complete absorption of the total released energy of each alpha decay; and fourth step, S400 to make isotope identification and radioactivity measurement of all kinds of alpha-emitting radionuclides in the gold foil by measuring the size and the rate of temperature signals.

The gold foil 10 ranges from 15 to 100 μm in thickness. The foil is folded into half, in which the source is placed. Therefore, the total thickness of the 4π geometry become twice of the foil.

The device is given a heat treatment in an oven for diffusion welding. The heat treatment may take 16 hours at 400° C. It provides a complete enclosure of the source.

The low temperature detector, which is attached to the 4π geometry, may be a superconducting transition edge sensor, a metallic magnetic calorimeter or a resistance thermometer.

Temperature signals are measured in form of spectrum. The measured spectrum in the fourth step is the decay energy spectroscopy of the radionuclides, wherein each line of the spectrum corresponds to the characteristic decay energy of specific alpha-emitting isotopes.

The present invention has the following advantages.

First, a gold foil encloses a sample to prevent alpha disintegration energy from radiating to the outside of the foil. The total decay energy is measured as a temperature signal. The complete absorption of the energy of the invention has achieved the decay energy (Q) spectroscopy. Picking up one single peak in the spectrum rather than several characteristic peaks in alpha spectroscopy is an important advantage in Q spectroscopy.

Second, the temperature signal is detected using a low temperature detector with high energy resolution to improve the identification accuracy.

Third, the absolute amount of alpha-emitting isotopes can be simultaneously obtained by counting pulses of the temperature signal and measuring magnitudes of the pulses.

Fourth, the radionuclide identification and its amount measurement can be performed without radiochemical separation. Thus, the invention simplifies the pretreatment of radioactive specimens.

Lastly, the confusion with chemical matrixes occurring in mass spectrometry, such as ICP-MS, can be prevented because the present invention measures the characteristic decay energy of radionuclides in the specimen.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 2 is a flow chart illustrating a method of measuring absolute alpha radioactivity and identifying radionuclides using a low temperature detector according to the present invention.

DETAILED DESCRIPTION OF THE PREFERRED EMBODIMENT

Figure 1:
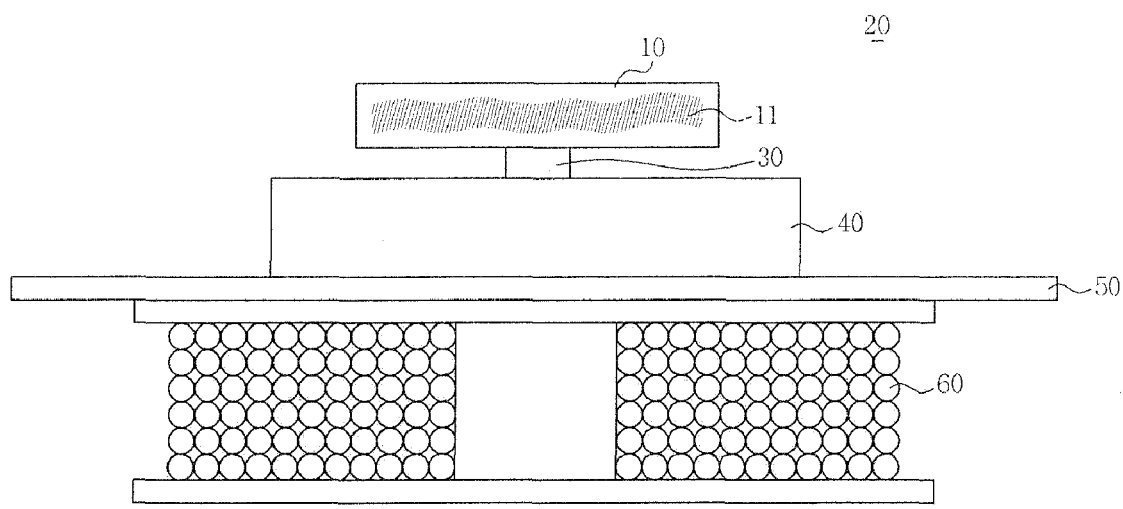
FIG. 1 illustrates an apparatus for an absolute radioactivity measurement and identification of alpha-emitting radionuclides using a low temperature detector according to the present invention.

The present invention will be described in detail with reference to the attached drawings.

FIG. 1 illustrates an apparatus for measuring absolute alpha radioactivity and identifying alpha-emitting radionuclides using a low temperature detector. According to the present invention, any low temperature detector with high enough sensitivity to resolve the decay energy from various radionuclides of interest can be employed as the thermometer to measure the temperature rise of the $4\pi$ absorber. The low temperature detector is based on the sensitive dependence on its electrical resistance, magnetization, or other physical quantities sensitive to the temperature variation. For example, a superconducting transition edge sensor, a metallic magnetic calorimeter or an accurate resistance thermometer, which can perform high-precision analysis, can be used. It is preferable to use the metallic magnetic calorimeter with high energy resolution as the low temperature detector because of a wide range of operating temperature and convenience to make thermal connection to the $4\pi$ absorber.

Referring to FIG. 1, the present invention includes gold foil 10 to envelope a radioactive specimen 11, a chamber of a cryostat 20, a low temperature detector 30, measuring means 40, a sample holder 50 and a superconducting magnet 60.

The gold foil 10 enclosing the alpha-emitting sample 11 has a thickness ranging from 15 to 100 μm. It provides enough thickness to prevent alpha disintegration energy from radiating to the outside of the foil. The thickness must be limited not to increase the volume of a gold foil to optimize the temperature change due to an energy input.

While various methods can be used to enclose the sample 11 with the gold foil 10, it is preferable to use a diffusion welding method that presses an object with a vise in an oven. The heat treatment may take 16 hours at 400° C. It provides a complete enclosure of the source.

The chamber 20 is a low-temperature cryostat that maintains the inner temperature lower than 1 K.

In the present embodiment, a Au:Er sensor, gold doped with erbium of 800-900 ppm, can be used as a low temperature detector 30. It is attached to the gold foil 10 with a wedge-bonding technique.

The measuring means 40 measures a signal produced by the low temperature detector 30. It can be a low noise SQUID (Superconducting Quantum Interference Device) susceptometer. The sample holder 50 provides a mechanical support and a thermal contact to the bottom face of the measuring means 40. In case of using a metallic magnetic calorimeter as a temperature sensor, magnetic field must be applied to the Au:Er sensor. The magnetic field can be produced by a superconducting magnet 60 on the back side of the holder 50, or by an on-chip planar superconducting coil of the SQUID susceptometer.

The apparatus according to the present invention identifies alpha-emitting radionuclides by means of measuring temperature signals from the temperature sensor 30 due to the absorption of the alpha decay energy (Q). It also determines the absolute amount of the radionuclides by counting the number of the pulses for each of the identified nuclides.

A calorimetric method of radioactivity measurement and identification of alpha-emitting radionuclides using a low temperature detector according to the present invention will be explained.

FIG. 2 is a flow chart illustrating the method of isotope identification and measurement of alpha-emitting radionuclides using a low temperature detector according to the present invention. Referring to FIG. 2, the chart includes four steps: first step, S100 to make a $4\pi$ metallic geometry with a gold foil 10 which encloses a radioactive sample 11; second step, S200 to attach the low temperature detector 30 to the gold foil 10 and locate on the measuring means 40; third step, S300 to obtain temperature signals according to a temperature rise caused by complete absorption of the total released energy of each alpha decay; and fourth step, S400 to make isotope identification and radioactivity measurement of every alpha-emitting radionuclide in the gold foil by measuring the size and the number of temperature signals.

In the first step, S100, the gold foil capsulating the radioactive specimen 10 is prepared. The gold foil 10 is an absorber fabricated to enclose the sample 11. The gold foil 10 is described above so that explanation thereof is omitted.

In the second step, S200, the low temperature detector 30 attached to the gold foil 10 is located on the measuring means 40. According to the present invention, a low temperature detector with its resistance or magnetization sensitive to the temperature variation can be employed for the given purpose, such as, a superconducting transition edge sensor, a metallic magnetic calorimeter or a resistance thermometer.

In the third step, S300, temperature signals due to alpha decays are obtained using the low temperature detector while the sample holder 50 is maintained at a constant temperature below 1 K. The energy generated from the alpha decay of the radionuclides is completely absorbed by the gold foil 10. This temperature variation is measured using the low temperature detector 30 with high energy resolution.

In the fourth step, S400, the identification of alpha-emitting radionuclides is performed by measuring temperature changes of the temperature sensor 30 due to the absorption of the alpha decay energy. The identification is based on the fact that every alpha-emitting radionuclide has its own characteristic Q value. The absolute amount of the radionuclides can be determined by counting the number of the pulses for each of the identified nuclides.

Here, the temperature changes are measured in the form of an energy spectrum in the third step, S300. The identification of the radionuclides is determined by comparing the position of the peaks in the spectrum with the known Q values of various radionuclides in the forth step, S400.

In addition, in the forth step, S400, the absolute amount of radioactivity can be measured by counting the number of the temperature changes for each of the identified radionuclide simultaneously.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of making both isotope identification and radioactivity measurement of alpha-emitting radionuclides by using a low temperature detector, comprising the following steps in the following order:

- a first step (S100) to make a 4 π metallic absorber with a metal foil (10) which encloses radioactive material 11, containing alpha-emitting radionuclides;
- a second step (S200) to make a thermal connection between the metal foil (10) and the low temperature detector and to locate the low temperature detector on measuring means (40);
- a third step (S300) to obtain temperature pulses according to temperature changes caused by the complete absorption of the total decay energy of each alpha decay; and
- a fourth step (S400) to make isotope identification and radioactivity measurement of every alpha-emitting radionuclide in the metal foil by measuring the size and the number of temperature signals.

2. The method according to claim 1, wherein the metal foil (10) is a gold foil.

3. The method according to claim 1 wherein the metal foil (10) has a thickness ranging from 15 to 100 μm.

4. The method according to claim 2 wherein the metal foil (10) has a thickness ranging from 15 to 100 μm.

5. The method according to claim 1 wherein the low temperature detector is a superconducting transition edge sensor, a metallic magnetic calorimeter or a resistance thermometer.

6. The method according to claim 2 wherein the low temperature detector is a superconducting transition edge sensor, a metallic magnetic calorimeter or a resistance thermometer.

7. The method according to claim 1 wherein the temperature signals are gained in a form of spectrum.

8. The method according to claim 2 wherein the temperature signals are gained in a form of spectrum.

9. The method according to claim 7 wherein the spectrum is the decay energy spectroscopy of the radio nuclides in the metal foil (10) wherein each line of the spectrum corresponds to the characteristic decay energy of specific alpha-emitting radionuclide.

10. The method according to claim 8 wherein the spectrum is the decay energy spectroscopy of the radio nuclides in the metal foil (10) wherein each line of the spectrum corresponds to the characteristic decay energy of specific alpha-emitting radionuclide.

* * * * *